(12) United States Patent
Louch

(10) Patent No.: US 9,860,354 B2
(45) Date of Patent: *Jan. 2, 2018

(54) ELECTRONIC DEVICE WITH CAMERA-BASED USER DETECTION

(71) Applicant: Apple Inc., Cupertino, CA (US)

(72) Inventor: John O. Louch, Boulder, CO (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,694

(22) Filed: Feb. 3, 2017

(65) Prior Publication Data

US 2017/0149944 A1    May 25, 2017

Related U.S. Application Data

(60) Continuation of application No. 15/087,795, filed on Mar. 31, 2016, now Pat. No. 9,596,333, which is a division of application No. 14/216,344, filed on Mar. 17, 2014, now Pat. No. 9,332,104, which is a continuation of application No. 12/033,706, filed on Feb. 19, 2008, now Pat. No. 8,676,224.

(51) Int. Cl.
| | |
|---|---|
| *H04B 7/00* | (2006.01) |
| *H04M 1/00* | (2006.01) |
| *H04M 1/60* | (2006.01) |
| *H04M 1/725* | (2006.01) |
| *G06F 3/0481* | (2013.01) |
| *G06F 3/0488* | (2013.01) |

(52) U.S. Cl.
CPC .......... *H04M 1/6033* (2013.01); *H04M 1/605* (2013.01); *H04M 1/72569* (2013.01); *H04M 1/72583* (2013.01); *G06F 3/04817* (2013.01); *G06F 3/04886* (2013.01); *H04M 2250/12* (2013.01)

(58) Field of Classification Search
CPC ............. H04M 1/6033; H04M 1/6041; H04M 1/72583; H04M 2250/20
USPC .............. 455/41.2–41.3, 550.1, 556.1, 569.1
See application file for complete search history.

(56) References Cited

U.S. PATENT DOCUMENTS

| | | | |
|---|---|---|---|
| 5,224,151 | A | 6/1993 | Bowen et al. |
| 5,379,057 | A | 1/1995 | Clough et al. |
| 5,428,805 | A | 6/1995 | Morgan |
| 5,675,362 | A | 10/1997 | Clough et al. |
| 5,712,911 | A | 1/1998 | Her |
| 6,411,828 | B1 | 6/2002 | Lands et al. |
| 6,434,371 | B1 | 8/2002 | Claxton |
| 6,449,363 | B1 | 9/2002 | Kielsnia |
| 6,677,932 | B1 | 1/2004 | Westerman |
| 6,751,446 | B1 | 6/2004 | Kim et al. |
| 6,771,768 | B2 | 8/2004 | Dietz et al. |
| 6,853,850 | B2 | 2/2005 | Shim et al. |
| 6,993,366 | B2 | 1/2006 | Kim |
| 7,239,900 | B2 | 7/2007 | Choi et al. |

(Continued)

*Primary Examiner* — Simon Nguyen
(74) *Attorney, Agent, or Firm* — Zachary D. Hadd

(57) ABSTRACT

A speakerphone system integrated in a mobile device is automatically controlled based on the current state of the mobile device. In one implementation, the mobile device is controlled based on an orientation or position of the mobile device. In another implementation, the control of the speakerphone includes automatically controlling one or more graphical user interfaces associated with the speakerphone system.

20 Claims, 5 Drawing Sheets

(56) References Cited

U.S. PATENT DOCUMENTS

| | | | |
|---|---|---|---|
| 7,260,422 B2 | 8/2007 | Knoedgen | |
| 7,263,373 B2 | 8/2007 | Mattisson | |
| 7,400,316 B2 | 7/2008 | Appleyard et al. | |
| 7,493,573 B2 | 2/2009 | Wagner et al. | |
| 7,499,686 B2 | 3/2009 | Sinclair et al. | |
| 7,696,905 B2 | 4/2010 | Ellenby | |
| 7,697,962 B2* | 4/2010 | Cradick | H04M 1/605 455/569.1 |
| 7,774,029 B2 | 8/2010 | Lee et al. | |
| 7,920,696 B2 | 4/2011 | Chew | |
| 8,099,124 B2* | 1/2012 | Tilley | G06F 1/1626 455/550.1 |
| 2001/0044318 A1* | 11/2001 | Mantyjarvi | H03K 17/962 455/550.1 |
| 2004/0198332 A1 | 10/2004 | Lundsgaard | |
| 2005/0154798 A1 | 7/2005 | Nurmi | |
| 2005/0216867 A1 | 9/2005 | Marvit et al. | |
| 2005/0219228 A1* | 10/2005 | Alameh | G06F 1/1626 345/173 |
| 2006/0001647 A1* | 1/2006 | Carroll | G06F 3/0304 345/156 |
| 2006/0146009 A1* | 7/2006 | Syrbe | A63F 13/00 345/156 |
| 2007/0283264 A1 | 12/2007 | Vau et al. | |
| 2008/0034321 A1 | 2/2008 | Griffin | |
| 2008/0146289 A1 | 6/2008 | Korneluk et al. | |
| 2008/0188273 A1 | 8/2008 | You | |
| 2008/0220715 A1 | 9/2008 | Sinha et al. | |
| 2008/0280640 A1 | 11/2008 | Wedel et al. | |
| 2008/0280641 A1 | 11/2008 | Krinsensson et al. | |
| 2009/0024943 A1 | 1/2009 | Adler et al. | |
| 2009/0031257 A1 | 1/2009 | Arneson et al. | |
| 2009/0060170 A1 | 3/2009 | Couhglan | |
| 2009/0100384 A1 | 4/2009 | Louch | |
| 2009/0303204 A1* | 12/2009 | Nasiri | A63F 13/06 345/184 |
| 2012/0009982 A1 | 1/2012 | Dunko | |

* cited by examiner

Mapping States to Control Actions

| State of the Mobile Device | Control Action to the Speakerphone |
|---|---|
| The Mobile Device Orienting Towards/Away from a Voice Source | Deactivating / Activating Speakerphone |
| The Mobile Device in Proximity / within a Distance to a Voice Source | Deactivating / Activating Speakerphone |
| The Mobile Device being Gripped/Released by a User | Deactivating / Activating Speakerphone |
| The Mobile Device being Disconnected/Connected to Hardware Device(s) | Deactivating / Activating Speakerphone |
| The Mobile Device at an Angle more Horizontal/ Perpendicular with the Ground | Deactivating / Activating Speakerphone |
| The Mobile Device Receiving Higher/Lower Volume from a Voice Source | Deactivating / Activating Speakerphone |
| The Mobile Device Receiving Input / Not Receiving From User Interface | Deactivating / Activating Speakerphone |

FIG. 5

ELECTRONIC DEVICE WITH CAMERA-BASED USER DETECTION

RELATED APPLICATION

This application is a continuation of U.S. patent application Ser. No. 15/087,795, filed Mar. 31, 2016, which is a division of U.S. patent application Ser. No. 14/216,344, filed Mar. 17, 2014, now U.S. Pat. No. 9,332,104, which a continuation of U.S. patent application Ser. No. 12/033,706, filed Feb. 19, 2008, now U.S. Pat. No. 8,676,224, each of which are hereby incorporated by reference herein in their entireties. This application claims the benefit of and claims priority to U.S. patent application Ser. No. 15/087,795, filed Mar. 31, 2016, U.S. patent application Ser. No. 14/216,344, filed Mar. 17, 2014, now U.S. Pat. No. 9,332,104, and U.S. patent application Ser. No. 12/033,706, filed Feb. 19, 2008, now U.S. Pat. No. 8,676,224. This subject matter is related to U.S. patent application Ser. No. 11/937,463, for "Variable Device Graphical User Interface," filed Nov. 8, 2007, the subject matter of which is incorporated by reference herein in its entirety.

TECHNICAL FIELD

This subject matter is generally related to mobile devices.

BACKGROUND

Modern mobile devices (e.g., mobile phones, media players) often include a speakerphone system. The speakerphone system, which typically includes a loudspeaker and a microphone integrated into the mobile device, can free the user's hands and facilitate multi-party conversations using the mobile device. A typical speakerphone system for a mobile device is controlled by hardware and/or software mechanisms which require the user to make physical contact with the mobile device. When operating the mobile device in hands free mode, the user must manually activate the speakerphone system to engage in a conversation, and then deactivate the speakerphone system when finished with the conversation. Even if the user is holding the device, the manual steps of activating and deactivating the speakerphone system can be annoying to the user.

SUMMARY

A speakerphone system integrated in a mobile device is automatically controlled based on the current state of the mobile device. In one implementation, the mobile device is controlled based on an orientation or position of the mobile device. In another implementation, the control of the speakerphone includes automatically controlling one or more graphical user interfaces associated with the speakerphone system.

DESCRIPTION OF DRAWINGS

FIG. 5 illustrates an example data structure for mapping mobile device states to speakerphone control actions.

DETAILED DESCRIPTION

Speakerphone System Overview

Figure 1A:
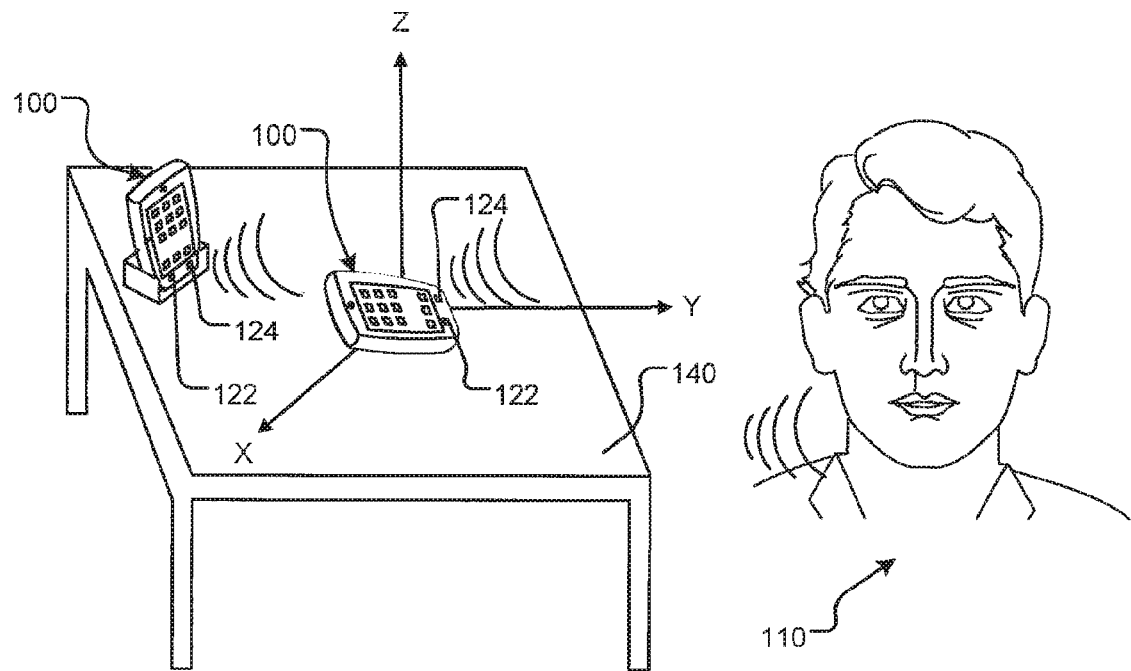
FIGS. 1A and 1B illustrate an example speakerphone system for a mobile device which can be managed based on a current state of the mobile device.
Figure 1B:
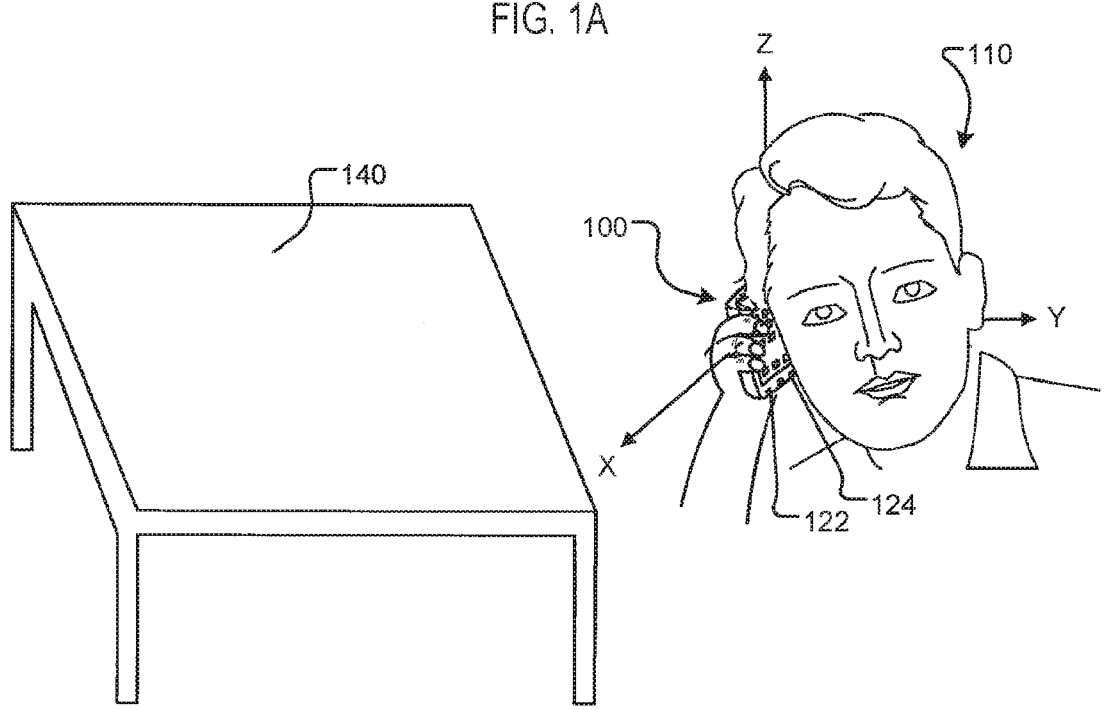

FIGS. 1A and 1B illustrate an example speakerphone system for a mobile device 100 which can be managed based on a current state of the mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices. The mobile device 100 can have an speakerphone system associated with the mobile device 100, e.g., an integrated speaker in the mobile device 100, or an external speaker wirelessly connected to the mobile device 100. The speakerphone system can include a microphone 122 which can be arranged on a front or back side of the mobile device 100 to facilitate hands-free operation during a telephone conversation or playback of audio content (e.g., music, voicemail). In various implementations, the speakerphone system also includes a loudspeaker 124 to deliver and/or amplify voice to reach a user of the mobile device 100.

The speakerphone system can be managed based on the current state of the Mobile device 100. In some implementations, the current state of the mobile device 100 can be determined using a reference frame and one or more sensors (e.g., accelerometer, gyro, light sensor, proximity sensor) integrated into the mobile device 100. A "state" can be an orientation or position of the device with respect to the reference frame. For example, when the mobile device 100 is laid flat on a surface (e.g., the x-y plane) of a table top 140, the speakerphone system can be activated to allow hands free operation. If the mobile device 100 is laying flat on a surface, an assumption can be made that the user intends to use the speakerphone system for hands free operation. Similarly, if the mobile device 100 is orientated substantially vertical (in the z-plane), an assumption can be made that the mobile device 100 is temporarily fixed in a docking or recharging device (as shown in FIG. 1A), and the speakerphone system can be activated to allow hands free operation while docked and/or while recharging.

A "state" of the mobile device 100 can also be determined based solely on sensor inputs. For example, one or more sensors (e.g., proximity sensor 268) on the front and/or back sides of the mobile device 100 can indicate a state of the mobile device 100. For example, if a first proximity sensor on the back side of the mobile device 100 is triggered and a second proximity sensor on the front side of the mobile device 100 is not triggered, then an assumption can be made that the mobile device 100 is laying flat on a surface. Based on this assumption, the speakerphone system can be controlled (e.g., activated) to allow hands free operation. If the first proximity sensor and/or the second proximity sensor are triggered, then an assumption can be made that the mobile device 100 is being held by the user or is stored (e.g., stored in a bag or case). Based on this assumption, the speakerphone system can be controlled differently (e.g., deactivated).

In some implementations, a processor (e.g., processor 304) in the mobile device 100 can use a state machine to maintain the current state of the mobile device 100. The state machine can track various combinations of inputs which can cause a state change to occur. A control action can then be issued based on the current state of the mobile device 100 as indicated by the state machine. A control action can be activating or deactivating the speakerphone system, generating or adjusting a graphical user interface and any other suitable control action.

For example, a first state of the mobile device 100 can be defined by a first proximity sensor on the back side of the mobile device 100 sensing proximity to an object (e.g., a table top surface) and a motion sensor not sensing motion of the mobile device 100 (e.g., acceleration is below a threshold value). The combination of these sensor inputs can place the state machine of the mobile device 100 into the first state. The first state can exist when the mobile device 100 is laying at rest, face up on a flat surface, for example. The control action can be activating the speakerphone system and adjusting the volume of the loudspeaker 124. Another control action can be to generate a graphical user interface, as described in U.S. patent application Ser. No. 11/937,463.

A second state of the mobile device 100 can be defined by the motion sensor sensing motion (e.g., acceleration above a threshold value). Such motion can place the state machine into the second state. The second state can exist when a user has picked up the mobile device 100 from the surface to make a call, for example. The control action can be lowering the volume of the loudspeaker 124. Other control actions are possible.

A third state of the mobile device 100 can be defined by a second proximity sensor located on the front side of the mobile device 100 sensing proximity to an object (e.g., the user's head) and the motion sensor not sensing motion of the mobile device 100 (e.g., acceleration is again below a threshold value). The combination of these sensor inputs can place the state machine of the mobile device 100 into the third state. The third state can exist when the user 110 has raised the mobile device 100 to the user's ear and the mobile device is no longer in motion. The control action can be deactivating the speakerphone system. Other control actions are possible.

It should be understood that any number of states and/or combinations of states can be defined and used to trigger control actions. The state machine can be implemented by a processor of the mobile device 100 (e.g., processor 304). The processor can also determine appropriate control actions based on the current state of the mobile device 100 as determined by the state machine.

Example Mobile Device

Figure 2:
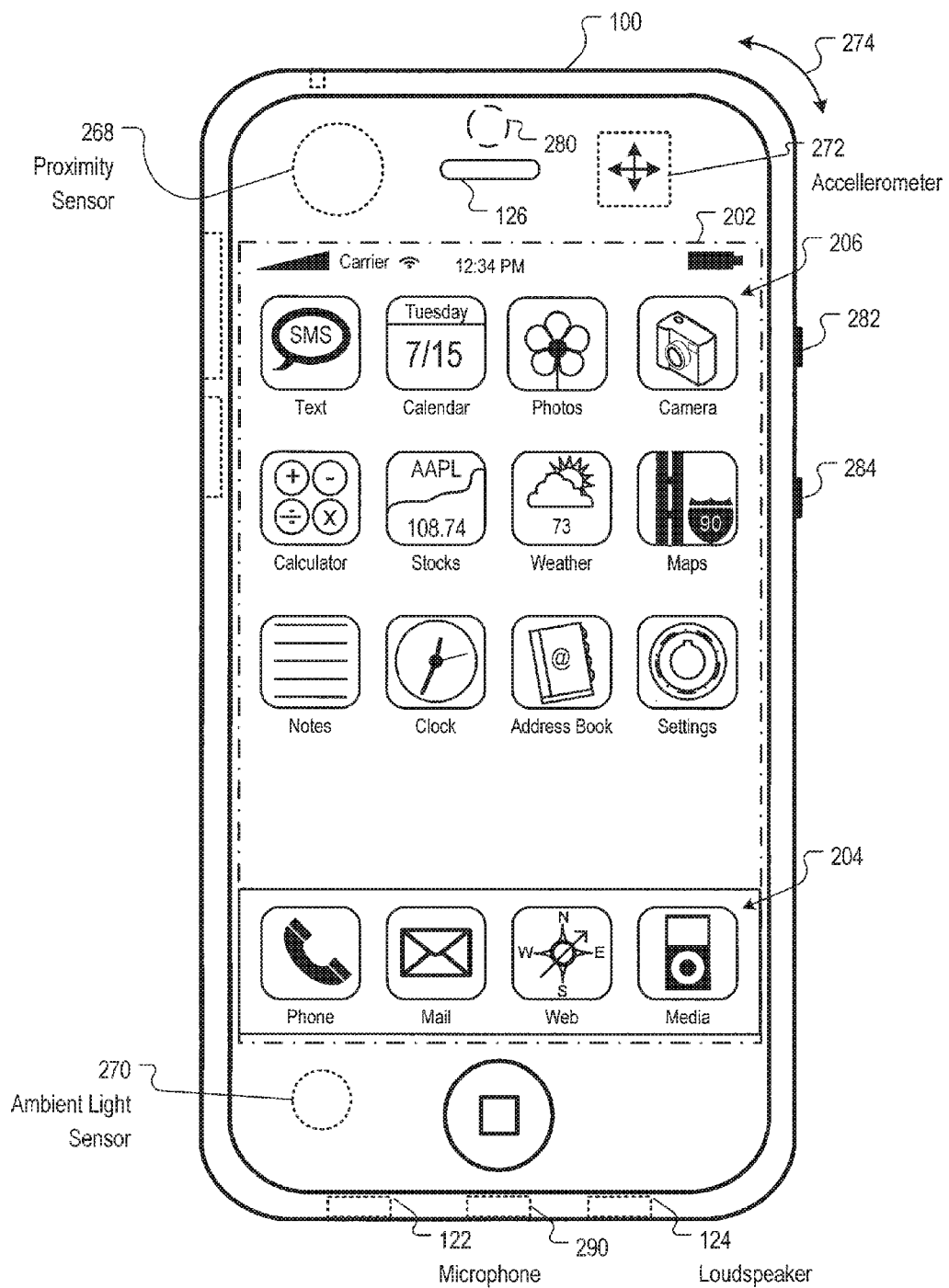
FIG. 2 illustrates a graphical user interface for the example mobile device.

FIG. 2 illustrates a graphical user interface for an example mobile device. As described in reference to FIG. 1, the mobile device 100 typically includes a built-in microphone 122 and loudspeaker 124. In some implementations, an up/down button 284 for volume control of the loudspeaker 124 and the microphone 122 can be included. The mobile device 100 can also include an on/off button 282 for a ring indicator of incoming phone calls. An audio jack 266 can also be included for use of headphones and/or a microphone.

In addition, as shown in FIG. 2, the mobile device 100 can include a display 202, which, in some implementations, is touch-sensitive. The touch-sensitive display 202 can implement liquid crystal display (LCD) technology, light emitting polymer display (LPD) technology, or some other display technology. The touch sensitive display 202 can be sensitive to haptic and tactile contact with a user.

In some implementations, the mobile device 100 can display one or more graphical user interfaces on the touch-sensitive display 202 for providing user access to various system objects and for conveying information to a user. In some implementations, the graphical user interfaces can include one or more display objects, e.g., 204 and 206. In the example shown, the display objects 204 and 206, are graphic representations of system objects. Some examples of system objects include device functions, applications, windows, files, alerts, events, or other identifiable system objects.

In some implementations, a proximity sensor 268 can be included to determine the current state of the mobile device 100 by detecting the user 110 positioning the mobile device 100 proximate to the user's ear, as described in reference to FIG. 1. In some implementations, the graphical user interface can be resized to reduce the graphical representations of display objects 204 and 206, e.g., graphical icons, and their corresponding touch areas (e.g., areas on the touch-sensitive display where a touch on the display 202 selects the graphical icons). In various implementations, an ambient light sensor 270 can also be used to determine the current state of the device. For example, the ambient light sensor 270 can sense when the mobile device 100 has been stored away. This sensor input can be used alone or in combination with other sensor inputs to determine the current state of the mobile device 100.

In some implementations, the microphone 122 can be used as a volume sensor which can detect the user's voice volume. For example, when the volume level from the voice source exceeds a default value, an assumption can be made that the user is speaking directly into the microphone 122 while holding the mobile device 100 to their ear, resulting in the speakerphone system being deactivated, for example.

In some implementations, the ambient light sensor 270 can be utilized to facilitate adjusting the brightness of the display 202, and an accelerometer 272 can be utilized to detect movement of the mobile device 100, as indicated by the directional arrow 274. Accordingly, the speakerphone system and a graphical user interface can be adjusted according to a detected orientation of the mobile device 100.

In some implementations, the mobile device 100 includes circuitry and sensors for supporting a location determining capability, such as that provided by the global positioning system (GPS) or other positioning systems (e.g., systems using access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 290) to provide access to location-based services. In some implementations, the mobile device 100 includes a gyroscopic sensor or other sensors that can be used to detect motion or orientation of the device with respect to a reference frame.

In some implementations, positioning sensors (e.g., an accelerometer 272) can be used to compute an instantaneous coordinate frame of the mobile device 100. For example, when the mobile device 100 is lying flat on a surface, an instantaneous coordinate frame centered on the mobile device 100 can be computed. For example, the z-axis can be perpendicular to the surface which can lie in the x-y plane in a right-handed coordinated system, as shown in FIG. 1A. If the user 110 moves the mobile device 100 to the position and orientation shown in FIG. 1B, then a trajectory for the mobile device 100 can be determined from the change in coordinates of the mobile device 100. For example, in reference to FIGS. 1A and 1B, the mobile device's 100 coordinate frame in FIG. 1A rotates by about ninety degrees with respect to the z-axis to change to a coordinate frame in FIG. 1B while the user 110 is holding the mobile device 100. Accordingly, the speakerphone system can be controlled according to the detected change of coordinate frames.

In some implementations, one or more sensors (e.g., a pressure sensor, temperature sensor) for detecting when a user is holding or gripping the mobile device 100 can be integrated into a housing of the mobile device 100. These sensors can detect when the mobile device 100 is gripped by a user, for example, by detecting a pressure exerted upon the body of the mobile device 100 or a partial temperature change (e.g., deviation from an ambient temperature) on the mobile device 100.

In some implementations, the mobile device 100 can include a touch sensor, which detects a user entering input via the graphical user interface, resulting in the speakerphone system being activated, for example. The user input can be received by the mobile device 100 from the user touching the touch-sensitive display 202, or from the user touching a keypad or a like device (not shown) associated with the mobile device 100.

In some implementations, the mobile device 100 can include a time sensor (e.g., using the internal clock of the mobile device 100), which detects a duration for a certain state (e.g., position, or orientation) of the mobile device 100. The detected duration can be used to determine if a control action will be triggered, to prevent overly frequent, unnecessary responses to each state change. By way of illustration, if the state change does not exceed a certain amount of time, e.g., five seconds, an assumption can be made that the state change is temporal, and therefore no control action will be triggered in response. By contrast, if the state change lasts longer than five seconds, an assumption can be made that the state change will remain for a longer period, and thus a control action can be triggered accordingly.

The decision whether to trigger a corresponding control action can also be made upon detection of time in combination with a transition distance of the mobile device 100, to enhance accuracy of the state determination. For example, in FIGS. 1A and 1B, if the mobile device 100 has been raised by the user 110 by twenty feet, for a interval exceeding five seconds, an assumption can be made that the user intends to use the handset for the telephone conversation. Accordingly, the speakerphone system can be deactivated in response to the assumption. Otherwise, the speakerphone system can remain unchanged until the state change is greater than a certain amount on time or distance.

In some implementations, a port device 290, e.g., a Universal Serial Bus (USB) port, or a docking port, or some other wired port connection, can be included. The port device 290 can, for example, be utilized to establish a wired connection to other computing devices, such as other communication devices, network access devices, a personal computer, a printer, a display screen, or other processing devices capable of receiving and/or transmitting data. In some implementations, the port device 290 allows the mobile device 100 to synchronize with a host device using one or more protocols, such as, for example, the TCP/IP, HTTP, UDP and any other known protocol.

In some implementations, the mobile device 100 can have hardware connection sensors that detect whether the mobile device 100 is connected to any hardware devices via the port device 290. When the mobile device 100 is being connected to hardware devices (e.g., a docking station or re-charger), it is more likely than not, a user of the mobile device 100 is not holding the handset, and thus the speakerphone system (e.g., the speaker volume and/or microphone sensitivity), and graphical user interface can be adjusted accordingly.

The mobile device 100 can also include a camera lens and sensor 280. In some implementations, the camera lens and sensor 280 can be located on the back surface of the mobile device 100. The camera can capture still images and/or video. In some implementations, the images captured by the camera can be used to measure proximity to a user or if the mobile device 100 is held by the user and the speakerphone system and graphical user interface can be activated or adjusted accordingly.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device Architecture

Figure 3:
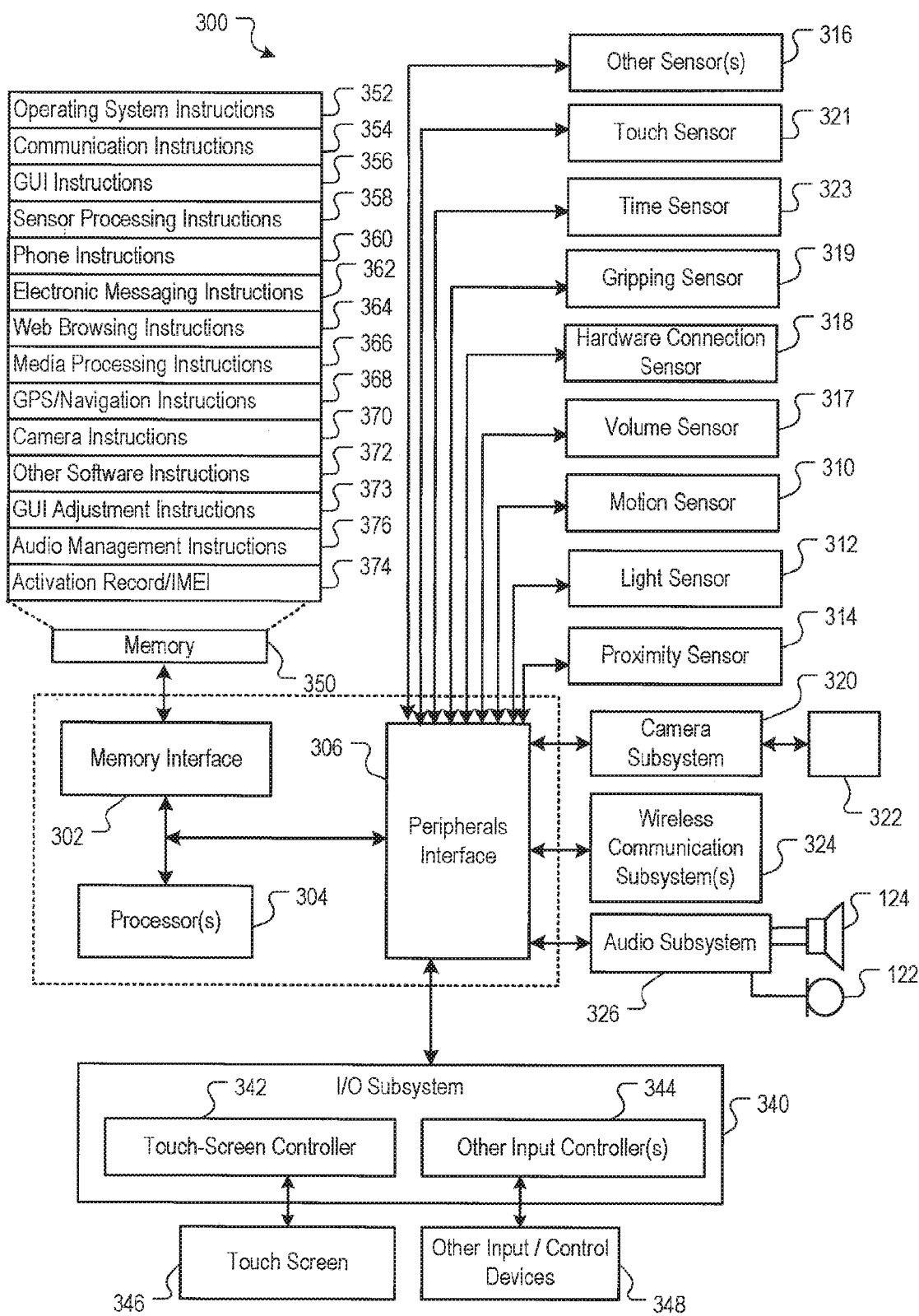
FIG. 3 is a block diagram of an example implementation of the mobile device of FIG. 2.

FIG. 3 is a block diagram of an example implementation 300 of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 2. A hardware connection sensor 318 can be coupled to the peripherals interface 306, to facilitate determining a state of connecting the mobile device 100 to any hardware, e.g., a docking station, a charger, a personal computer, etc. A gripping sensor 319 can be coupled to the peripherals interface 306, to determine if the mobile device 100 is being gripped. In various implementation, a gripping sensor can include a temperature sensor, and/or a pressure sensor. Further, a touch sensor 321 can be coupled to the peripherals interface 306, to detect if a user is touching user input interface, e.g., a touch screen or a keypad. A time sensor 323 can also be coupled to the peripherals interface 306, to detect a duration of a certain state of the mobile device 100. Other sensors 316 can also be connected to the peripherals interface 306, such as a positioning system (e.g., GPS receiver), a temperature sensor, a biometric sensor, a gyroscope, or other sensing device, to facilitate related functionalities.

A camera subsystem 320 and an optical sensor 322, e.g., a charged coupled device CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a loudspeaker 124, and microphone 122 to facilitate voice-enabled functions, for example, hands-free functionalities, voice recognition, voice replication, digital recording, and telephony functions.

The I/O subsystem 340 can include a touch screen controller 342 and/or other input controller(s) 344. The touchscreen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input; control devices 348, such as one or more buttons, rocker switches, thumb-wheel, infrared port, USB port; and/or a pointer device such as a stylus. The one or more buttons (not shown) can include an up/down button for volume control of the speaker 126 and loudspeaker 124 and/or the microphone 122.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/navigation instructions 368 to facilitate GPS and navigation-related processes and instructions; camera instructions 370 to facilitate camera-related processes and functions; GUI adjustment instructions 373 to facilitate adjustment of graphical user interfaces and user interface elements in response to sensor data; and/or other software instructions 372 to facilitate other processes and functions.

In addition, the memory 350 can store audio management instructions 376 to facilitate functions managing audio subsystem, including the loudspeaker 124, and the microphone 122. In some implementations, the audio management instructions 376 are operable to toggle the speakerphone system and adjust speaker volume and/or microphone sensitivity, in response to the sensor processing instructions 358.

The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 may be implemented in hardware and/or in software, including in one or more signal processing and/or application specific integrated circuits.

Example Process of Controlling Speakerphone System

Figure 4:
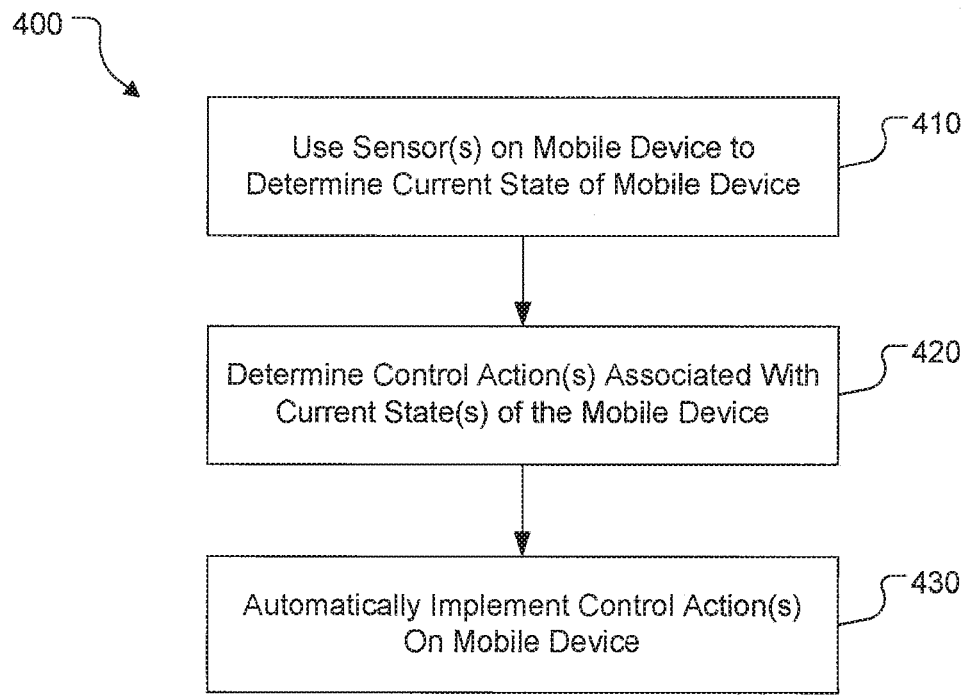
FIG. 4 illustrates an example process for managing a mobile device's speakerphone system based on a current state of the mobile device.

FIG. 4 illustrates an example process 400 for managing a mobile device's speakerphone system based on a current state of the mobile device 100. For convenience, the process 400 is described below in reference to FIGS. 1-3 (e.g., a mobile device 100, a speakerphone system, and other components that perform the process 400).

In some implementations, the process 400 can begin when input from one or more sensors on the mobile device are used to determine a current state of the mobile device (410). An example state can be a change of the mobile device's position or orientation relative to a user of the mobile device or a reference frame. The one or more sensors (e.g., accelerometer 272, motion sensor 310, proximity sensor 314, gyroscope) can detect changes in position and orientation of the mobile device, including the magnitude of those changes. In some implementations, the determining can include detecting and determining two or more different states based on inputs from two or more different sensors. For example, the mobile device can detect that the mobile device is being held or gripped, and also that the sound as well as the light sensors indicate proximity, to cross-check and/or determine a level of proximity and/or motion of the device.

The current state or a sequence of states are used to determine a control action (420). Some examples of control actions include activating and deactivating a speakerphone system and/or generating or adjusting one or more graphical user interfaces of the mobile device. The control action can then be implemented by one or more components of the mobile device (430) to, for example, automatically control a speakerphone system of the mobile device or generate and/or adjust graphical user interfaces of the mobile device.

Example of Mapping States to Control Actions

FIG. 5 illustrates an example data structure 500 for mapping mobile device states to speakerphone control actions. The mobile device 100 can use the data structure 500 to map the current state to one or more control actions. The states can be determined based on sensor inputs, as described in reference to FIGS. 1-4, and mapped to control actions which can be applied to the speakerphone system, a graphical user interface and any other feature, peripheral, application of the mobile device 100. Based on the target of a control action, the control actions can be implemented by sensor processing instructions 358, audio management instructions 376 and/or GUI adjustment instructions 373. In some implementations, the mobile device 100 can include a user-settable option to enable or disable control actions.

Referring to FIG. 5, the current state can be any desired state of the mobile device 100, including but not limited to: the Mobile device 100 being orienting towards or away from a user; the mobile device 100 being in proximity or within a distance to a user; the mobile device 100 being gripped or released by a user; the mobile device 100 being connected or disconnected to hardware device(s) (e.g., a docking station); the device 100 being held at a certain angle with reference to an instantaneous coordinate frame; volume levels received at the microphone 122; the device 100 receiving input from user interface or not; and other events that tend to denote a change of position, orientation, or state of the mobile device 100.

In various implementations, a control action applied to the speakerphone system can account for the magnitude of the determined event. For example, the sensitivity of the microphone 122 and/or the volume of the loudspeaker 124 can be adjusted in correspondence with the proximity change, thus guaranteeing optimal voice quality. As another example, an angle at which the mobile device 100 is being held can determine the angle of the speakerphone system relative to the ground, and correspondingly, the reception and transmission of sound waves by the speakerphone system can be affected by the angle relative to the ground. A control action can be made that accounts for this angle change. For example, if the mobile device 100 is held at an angle more parallel than perpendicular with a plane (e.g., the ground), the control action can increase the sensitivity and/or volume of the speakerphone system to optimize sending and receiving sound waves.

In some implementations, a control action can include resizing of one or more graphical user interfaces displayed on the mobile device 110, such as resizing of display objects 204 or 206 and their corresponding touch areas, shifting a graphical user interface or user interface elements in the graphical user interface, changing of a sensitivity level of the touch-sensitive display, and/or adjusting and enlarging of the target touch area of a user interface element based on an angle at which the device is being held, such as, for example, described in U.S. patent application Ser. No. 11/937,463.

In some implementations, a control action can include adjusting a parameter by a predefined amount or percentage. For example, a speaker's volume can be attenuated by a predetermined amount of decibels or a predetermined percentage of the original volume of the speaker. In some other implementations, the amount of an adjustment is based on the amount of detected motion, amount of detected acceleration, amount of change in orientation from a starting position, or the like. For example, if the amount of acceleration from rest is small, the amount of change of the speaker's volume is small as well.

In some implementations, the amount of adjustment can be based on user preferences. For example, the user can configure a device options and settings interface, for example) a maximum allowable amount (e.g., a percentage) for a type of adjustment. In some implementations, the user can toggle the automatic control of the speaker system through the graphical user interface.

In some implementations, a control action can include interrupting actions initiated by the user with additional confirmation steps. Rather than activating/deactivating or adjusting the speakerphone system by some amount, for example, the device can add confirmation dialogs or question interfaces to the user interface flow for particular actions. As an example, if a user attempts to make a call on device 100 while connecting the device 100 to a personal computer is detected, the device 100 can display a confirmation dialog box displaying and asking the user whether to activate the speakerphone system. The confirmation dialog box can have relatively large target touch areas for "Yes" and "No" buttons for the user to select to confirm or decline to activate speakerphone.

In some implementations, the mobile device 100 "learns" particular characteristics or patterns of the state of the device and/or the user's interactions with the device 100 in view of the state to determine which control action should be issued. By way of illustration, the mobile device 100 can have a learning mode, where the device 100 can "learn" by recording a detected state of the device 100, e.g., a trajectory of a notion, or a signature of proximity. Further, the device 100 can compare its state detected from the sensor input to the one or more patterns already stored in the device 100, e.g., a signature of a bouncing motion while the user is walking, a signature of a change in orientation, a trajectory while the user is picking up and raising the device 100, etc. If the detected state matches one of the patterns, the mobile device 100 can apply to the speakerphone system and/or graphical user interface the corresponding control action to the matching pattern. In some scenarios, the device 100 can apply the control action based on the closest pattern determined from the comparison.

In various implementations, the patterns that can be compared to the detected state are related to detected volume levels, detected gripping, detected proximity, detected user input, or other states that can be associated with patterns. In some implementation, the patterns can be configured or modified by the user or by learning from the user's past preference of a control action given a detected state. In some implementations, the patterns and the control action account for the magnitude of the state, e.g., the level of detected volume, or the distance of the motion.

In some implementations, the device 100 includes an indicator, e.g., a light indicator, to signify that an adjustment to the speakerphone system is being made. For example, the light indicator can show different colors to signify different adjustments to the speakerphone system that are being made. In some implementations, a control action can include changing lighting of the display of the device 100, providing a user a better vision of the graphical user interface. In various implementations, the different lighting of the display can indicate that some changes to the speakerphone system are being made.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube), LCD (liquid crystal display) monitor, touch sensitive device or display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in single software product or packaged into multiple software products.

Thus, particular embodiments have been described. Other embodiments are within the scope of the following claims.

What is claimed is:
1. A cellular telephone comprising:
  a body having a length dimension, a width dimension that is shorter than the length dimension, and four sidewalls connected by curved corners, wherein the body forms a rear surface of the cellular telephone;
  a touch sensitive display that is mounted in the body and that forms a front surface of the cellular telephone opposite the rear surface;
  an infrared emitter;
  an ambient light sensor on the front surface;
  a microphone mounted along a first one of the four sidewalls that extends in the width dimension;
  a speaker on the front surface along a second one of the four sidewalls that also extends in the width dimension and that is opposite the first one of the four sidewalls;
  a camera on the front surface along the second one of the four sidewalls, wherein the camera captures images; and a processor configured to determine whether the cellular telephone is being held by a user based on the captured images and configured to display graphical user interface information on the touch sensitive display in response to determining that the cellular telephone is being held by the user.

2. The cellular telephone defined in claim 1, wherein the graphical user interface information comprises a plurality of user-selectable icons corresponding to applications on the cellular telephone.

3. The cellular telephone defined in claim 1, wherein the graphical user interface information comprises text.

4. The cellular telephone defined in claim 1, further comprising:
a sensor that generates sensor data in response to motion of the cellular telephone.

5. The cellular telephone defined in claim 4, wherein the processor determines an angle at which the cellular telephone is oriented based on the sensor data.

6. The cellular telephone defined in claim 1 further comprising an additional speaker mounted along the first one of the four sidewalls.

7. A method for operating an electronic device having a processor, a display, and a camera, the method comprising:
with the camera, capturing images;
with the processor, determining from the captured images whether the electronic device is being held by a user; and
with the processor, presenting graphical user interface information on the display in response to determining that the electronic device is being held by the user.

8. The method defined in claim 7 wherein the electronic device includes a sensor, the method further comprising:
with the sensor, measuring an angle at which the electronic device is oriented.

9. The method defined in claim 7 wherein the electronic device includes a speaker, the method further comprising:
with the processor, generating audio through the speaker in response to determining that the electronic device is being held by the user.

10. The method defined in claim 7, wherein presenting the graphical user interface information comprises presenting a plurality of graphical icons for applications on the electronic device.

11. The method defined in claim 10, wherein the display is a touch-sensitive display, the method further comprising:
with the touch-sensitive display, detecting user touch input at one of the plurality of graphical icons; and
opening an application on the electronic device in response to the user touch input at the one of the plurality of graphical icons.

12. The method defined in claim 7, wherein the electronic device includes a microphone, the method further comprising:
with the processor, adjusting a sensitivity of the microphone in response to determining that the electronic device is being held by the user.

13. A handheld electronic device comprising:
a camera that captures first and second images;
a processor that determines whether the handheld electronic device is being used by a given user based on the first and second images; and
a display that displays graphical user interface information in response to the processor determining that the handheld electronic device is being used by the user.

14. The handheld electronic device defined in claim 13, wherein the handheld electronic device has front and back opposing surfaces, and wherein the camera and the display are formed on the front surface.

15. The handheld electronic device defined in claim 14, wherein the handheld electronic device is a cellular telephone having four sidewalls and rounded corners.

16. The handheld electronic device defined in claim 15, wherein the display is a touch-sensitive display.

17. The handheld electronic device defined in claim 16, further comprising:
an infrared transmitter.

18. The handheld electronic device defined in claim 13, wherein the graphical user interface information comprises text.

19. The handheld electronic device defined in claim 13, further comprising a sensor that generates sensor data based on movement of the handheld electronic device, wherein determining whether the handheld electronic device is being used by the user comprises determining whether the handheld electronic device is being held by the user.

20. The handheld electronic device defined in claim 19, wherein the processor is configured to determine an angle at which the handheld electronic device is being held based on the sensor data.

* * * * *